US010165631B2

United States Patent
Gaines et al.

(10) Patent No.: US 10,165,631 B2
(45) Date of Patent: Dec. 25, 2018

(54) DEVICE FOR IMPROVING COMPATIBILITY OF SOLID STATE LIGHT SOURCES WITH PHASE-CUT DIMMERS

(75) Inventors: James M. Gaines, Lexington, MA (US); H. Andrew Mayo, Acton, MA (US); Bertrand Johan Edward Hontele, Breda (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 274 days.

(21) Appl. No.: 14/239,548

(22) PCT Filed: Sep. 6, 2012

(86) PCT No.: PCT/IB2012/054597
§ 371 (c)(1),
(2), (4) Date: Feb. 19, 2014

(87) PCT Pub. No.: WO2013/035055
PCT Pub. Date: Mar. 14, 2013

(65) Prior Publication Data
US 2014/0191683 A1 Jul. 10, 2014

Related U.S. Application Data

(60) Provisional application No. 61/531,167, filed on Sep. 6, 2011, provisional application No. 61/607,194, filed on Mar. 6, 2012.

(51) Int. Cl.
*H05B 33/08* (2006.01)

(52) U.S. Cl.
CPC ......... *H05B 33/08* (2013.01); *H05B 33/0812* (2013.01); *Y02B 20/343* (2013.01); *Y02B 20/383* (2013.01)

(58) Field of Classification Search
CPC ............ H05B 33/0815; H05B 33/0809; H05B 33/08; H05B 33/0812; H05B 33/0824;
(Continued)

(56) References Cited

U.S. PATENT DOCUMENTS

| | | | |
|---|---|---|---|
| 2008/0203934 A1* | 8/2008 | Van Meurs | ........ H05B 41/3924 315/224 |
| 2008/0278092 A1* | 11/2008 | Lys | .................... H05B 33/0815 315/247 |

(Continued)

FOREIGN PATENT DOCUMENTS

| | | |
|---|---|---|
| DE | 102009031967 B3 | 5/2011 |
| EP | 2355618 A1 | 8/2011 |

(Continued)

*Primary Examiner* — Douglas W Owens
*Assistant Examiner* — Amy Yang
(74) *Attorney, Agent, or Firm* — Akarsh P. Belagodu (57) ABSTRACT

A device suppresses flicker and improves compatibility of a lamp including at least one solid state light source, the lamp being operably connected to a control circuit, such as a dimmer circuit. The device includes a connector enabling connection of the solid state light source to a lamp socket configured to receive an incandescent light source, and an adapter circuit connected in parallel with the at least one solid state light source when the solid state light source is connected to the socket via the connector. The adapter circuit provides a resistive path for current to pass through the lamp, during all or part of the AC mains cycle.

6 Claims, 11 Drawing Sheets

(58) Field of Classification Search
CPC ............ H05B 33/0845; H05B 33/0803; H05B 41/2853; H05B 41/3924
USPC ......... 315/209 R, 291–294, 307, 308, 185 R
See application file for complete search history.

(56) References Cited

U.S. PATENT DOCUMENTS

| | | |
|---|---|---|
| 2010/0084990 A1 | 4/2010 | Ang et al. |
| 2010/0117552 A1 | 5/2010 | Lee |
| 2010/0253235 A1 | 10/2010 | Tsai |
| 2010/0277067 A1* | 11/2010 | Maxik et al. .................. 315/32 |
| 2011/0057578 A1 | 3/2011 | Otake et al. |
| 2011/0068706 A1* | 3/2011 | Otake et al. .................. 315/291 |
| 2011/0095700 A1* | 4/2011 | Kanamori et al. ............ 315/291 |
| 2011/0181190 A1 | 7/2011 | Lin |
| 2011/0193488 A1* | 8/2011 | Kanamori et al. ........ 315/209 R |
| 2012/0056553 A1* | 3/2012 | Koolen .............. H05B 33/0815 315/291 |
| 2012/0274216 A1* | 11/2012 | Datta ........................... 315/127 |
| 2013/0057169 A1* | 3/2013 | Harel ................ H05B 33/0815 315/200 R |
| 2013/0278159 A1* | 10/2013 | Del Carmen, Jr. ......................... H05B 33/0809 315/200 R |

FOREIGN PATENT DOCUMENTS

| | | |
|---|---|---|
| JP | 2010198943 A | 9/2009 |
| JP | 2010219279 A | 9/2010 |
| JP | 2011165599 A | 8/2011 |

\* cited by examiner

DEVICE FOR IMPROVING COMPATIBILITY OF SOLID STATE LIGHT SOURCES WITH PHASE-CUT DIMMERS

This application is the U.S. National Phase application under 35 U.S.C. § 371 of International Application No. PCT/2012/054597, filed Sep. 6, 2012, which claims the benefit of U.S. Provisional Patent Application No. 61/531,167 filed Sep. 6, 2011 and U.S. Provisional Patent Application No. 61/607,194 filed Mar. 6, 2012. These applications are hereby incorporated by reference herein.

TECHNICAL FIELD

The present invention is directed generally to control of solid state light sources. More particularly, various inventive apparatuses disclosed herein relate to improving compatibility of dimmable solid state light sources with phase-cut dimmers. This invention may also be of use in other circuits containing lamps and controls, such as circuits with occupancy sensors, or switches incorporating a night-light—any circuit that requires a current path during the off-state of the lamp for proper standby operation.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects.

Recently, retrofit solid state light source devices, such as LED lamps, have entered the market in large numbers, including solid state light source devices that may be part of a dimmer circuit. For example, dimmable screw base LED lamps may be configured to screw into lamp sockets designed for screw base incandescent light bulbs, and pin base LED lamps may be configured to plug into pin sockets designed for pin base incandescent and/or fluorescent bulbs.

Dimmers are usually connected in series with the load (2-wire connection), and depend for their proper operation on the conduction of current through the load. In case of a conventional incandescent lamp, the load is behaving like a resistor, but in case of an electronic load (energy-saving LED lamp), the load characteristics differ considerably in amplitude and time (during a mains cycle). For simplicity, only (phase cut) dimmers are mentioned here, but the same holds for electronic switches with or without advanced controls (light sensors, presence detectors, timer circuits, remote controls, etc.)

Retrofit LED lamps are often incompatible with existing dimmers, which results in flickering and/or flashing of the LED lamps, or no light output at all. Flickering may occur at particular dimming phase angles, or over a wide range of dimming phase angles, depending on the LED lamp/dimmer combination, as well as the number of LED lamps on the dimmer circuit. For example, some dimmers function correctly for small numbers of LED lamps per dimmer circuit, but begin to cause flicker as the number of LED lamps increases. Also, for dimmers that require continuous small current flow through the LED lamps to power the dimmer circuitry (even when the lamps are off), performance is especially inadequate. Notably, flickering may be reduced by including at least one incandescent lamp among the LED lamps in the dimmer circuit. However, inclusion of an incandescent lamp compromises the high efficiency and long lifetimes of the LED lamps, and availability of incandescent lamps may be limited in the future. Also, inclusion of an incandescent lamp is not an option when the dimmer circuit consists of a single lamp.

Thus, there is a need in the art for a circuit that can be added to a retrofit solid state light source in a dimmer circuit, which reduces or eliminates flicker and/or otherwise improves compatibility between the low-power light source and a control circuit therefor, for example, between the light source and the dimmer circuit, regardless of the type of dimmer, the dimming phase angle and/or the number of solid state light sources included in the dimmer circuit.

SUMMARY

The present disclosure is directed to inventive apparatus for suppressing flicker of a solid state light source in a dimmer circuit, using adapter circuit connected in parallel with the solid state light source.

Generally, in one aspect, the invention focuses on a device for suppressing flicker and/or improving compatibility of a lamp including at least one solid state light source, the lamp being operably connected to a control circuit, such as, for example, a dimmer circuit, an occupancy sensor circuit, or a switched circuit that has a nightlight. The device includes a connector enabling connection of the solid state light source to a lamp socket configured to receive an incandescent light source, and an adapter circuit connected in parallel with the at least one solid state light source when the solid state light source is connected to the socket via the connector.

In another aspect, the invention relates to an extender device for suppressing flicker and/or improving compatibility in a lighting unit including at least one light emitting diode (LED), the device including an extender base, an extender socket and an adapter circuit. The extender base is configured to be inserted into a lamp socket connected to a control circuit, for example, a dimmer, the lamp socket being configured to receive an incandescent lighting unit. The extender socket is configured to receive the lighting unit including the at least one LED. The adapter circuit is located between the extender base and the extender socket, and is configured to be electrically connected in parallel with the at least one LED when the lighting unit is inserted in the extender socket, such that the adapter circuit suppresses flicker of the at least one LED caused by the dimmer. The circuit may also be implemented in a module insertable between the lamp and the screw base socket.

In yet another aspect, the invention relates to a retrofit solid state light source device, which includes a driver, a solid state lighting module, a flicker suppression/compatibility enhancement circuit and a connector. The driver is configured to receive a dimmed mains voltage from a dimmer and to output a drive current based on a dimming level of the dimmed mains voltage. The solid state lighting module includes at least one solid state light source, and is configured to receive the drive current from the driver. The flicker suppression circuit is connected in parallel with the solid state lighting module for suppressing flicker of the at least one solid state light source and/or improving compatibility of the at least one solid state light source with dimmers or other controllers. The connector is configured to connect the solid state light source device with a socket configured to receive an incandescent lighting unit.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Applicants have recognized and appreciated that it would be beneficial to provide a circuit capable of suppressing flicker and improving compatibility of an LED or other solid state light source, for example, when included in a dimmer circuit or other kind of control circuit.

Thus, according to various embodiments, a flicker suppression/compatibility enhancement circuit (also referred to as an "adapter circuit") includes a resistance or other circuit in parallel with one or more solid state light sources. The circuit imitates the effect of including an incandescent light source with the one or more solid state light sources in a dimmer circuit. The circuit may be included in a simple screw or pin base extender, for example, enabling the resistance to be placed in any screw base or pin base lamp socket, respectively. It may be in the form of a thin disk that fits into the screw base, inserted between the lamp and the screw base. Likewise, the extender may include a screw or pin base socket for receiving a lamp containing the solid state light source. Alternatively, the circuit may be included in the lamp or the dimmer itself. For larger numbers of LEDs on a circuit, additional circuits may be provided, as needed, to reduce or suppress flickering and improve compatibility with controls.

Figure 1A:
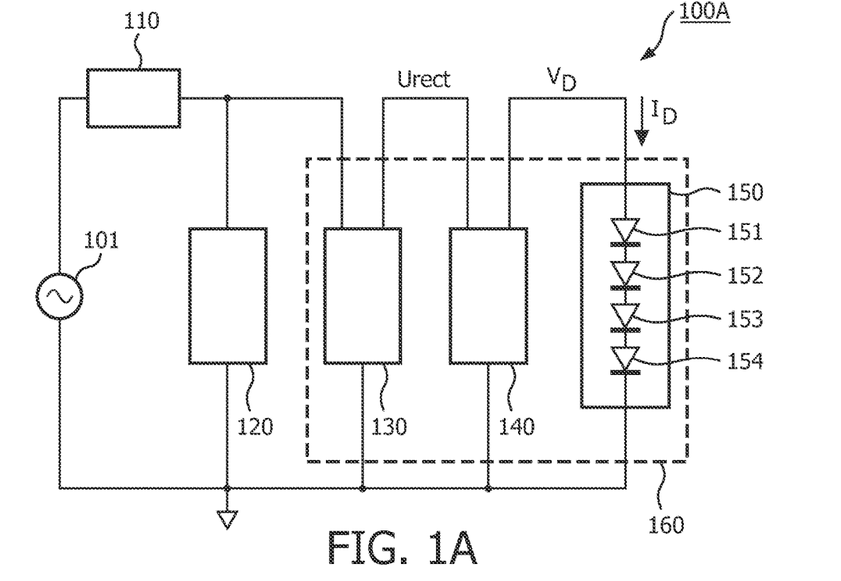
FIGS. 1A and 1B are simplified block diagrams showing dimmable lighting systems, including a flicker suppression/compatibility enhancing circuit (also referred to herein as "adapter circuit"), according to representative embodiments.
Figure 1B:
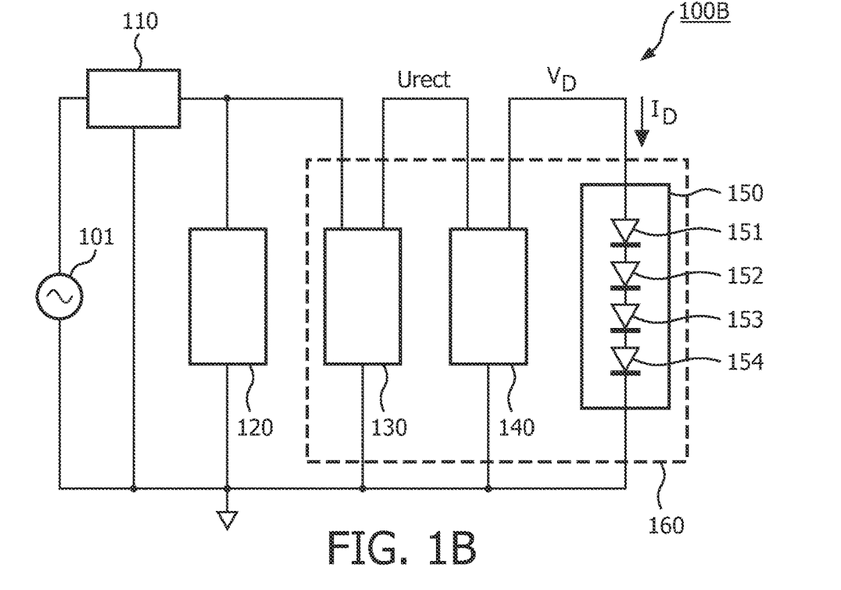

FIGS. 1A and 1B are block diagrams showing dimmable lighting systems, including an adapter circuit, according to representative embodiments. FIGS. 1A and 1B depict dimmable lighting systems 100A and 100B, respectively, each of which includes dimmer 110 connected between voltage mains 101 and lighting unit 160 to provide dimmed AC mains voltage to the lighting unit 160. FIGS. 1A and 1B are substantially the same, except that the dimmable lighting system 100A in FIG. 1A includes the dimmer 110 without a neutral connection, and the dimmable lighting system 100B in FIG. 1B includes the dimmer 110 with a neutral connection.

Each of the dimmable lighting systems 100A and 100B includes an adapter circuit 120 connected in parallel with the lighting unit 160 following the dimmer 110, discussed below. In various embodiments, the lighting unit 160 may be an LED lamp retrofit for use with conventional lamp sockets designed for incandescent light bulbs. For example, in the depicted embodiment, the lighting unit 160 includes LED lighting module 150 comprising multiple LEDs connected in series with one another, indicated by representative LEDs 151-154. Of course, the lighting unit 160 may include other types of solid state light sources without departing from the scope of the present teachings. The lighting unit 160 further includes voltage rectifier 130 and power converter 140, as well as optics (not shown), if needed, to meet various design specific requirements, such as beam shaping and/or color influencing.

The dimmer 110 may be any type of circuit configured to provide dimming capability, e.g., by operation of a slider or other mechanism, or through a programmable interface with a controller. According to mains voltage based dimming schemes, for example, the amount of light output is reduced as the mains voltage is reduced via the dimmer 110. Dimming of the LED module 150 is achieved by changing the drive voltage/drive current output by the voltage rectifier 130 and/or the power converter 140 in response to changes in the mains voltage. Different mains voltage dimming schemes may be implemented, such as bi-level dimming, in which the light output switches between two levels depending on the level of the mains voltage, and linear dimming, in which the light output decreases (e.g., linearly) as the level of the mains voltage is reduced. For example, the dimmer 110 in FIG. 1A may be a phase chopping dimmer, which provides dimming capability by chopping leading edges (leading edge dimmer) or trailing edges (trailing edge dimmer) of voltage signal waveforms from the voltage mains 101. The voltage mains 101 may provide different unrectified input mains voltages, such as 100 VAC, 120 VAC, 230 VAC and 277 VAC, according to various implementations.

The voltage rectifier 130 receives the dimmed AC line voltage and provides rectified voltage to the power converter 140. The power converter 140 may include a power transformer and a boost power factor correction (PFC) circuit, for example, and is generally configured to convert the rectified voltage from the voltage rectifier 130 to corresponding DC voltage and corresponding current for powering the LED lighting module 150, indicated as LED drive voltage $V_D$ and LED drive current $I_D$. The voltage rectifier 130 and the power converter 140 may be collectively referred to as an LED driver.

The means by which the LED driver controls the drive voltage $V_D$ and drive current $I_D$ to the LED lighting module 150 may vary without departing from the scope of the present teachings. For example, the LED driver may further include a dimmer phase angle detector that detects the dimmer phase angle and provides a control signal for adjusting the LED drive voltage $V_D$ and/or LED drive current $I_D$ to the LED lighting module 150. Alternatively, the LED driver may further include a mains sensing circuit that receives the rectified mains voltage from the voltage rectifier 130 and provides a mains sense signal indicating the level of dimming to a controller, which also receives actual voltage and current information from the LED lighting module 150. The controller is then able to provide feedback to the power converter 140 for adjusting the LED drive voltage $V_D$ and/or the LED drive current $I_D$ provided to the LED lighting module 150.

Figure 4:
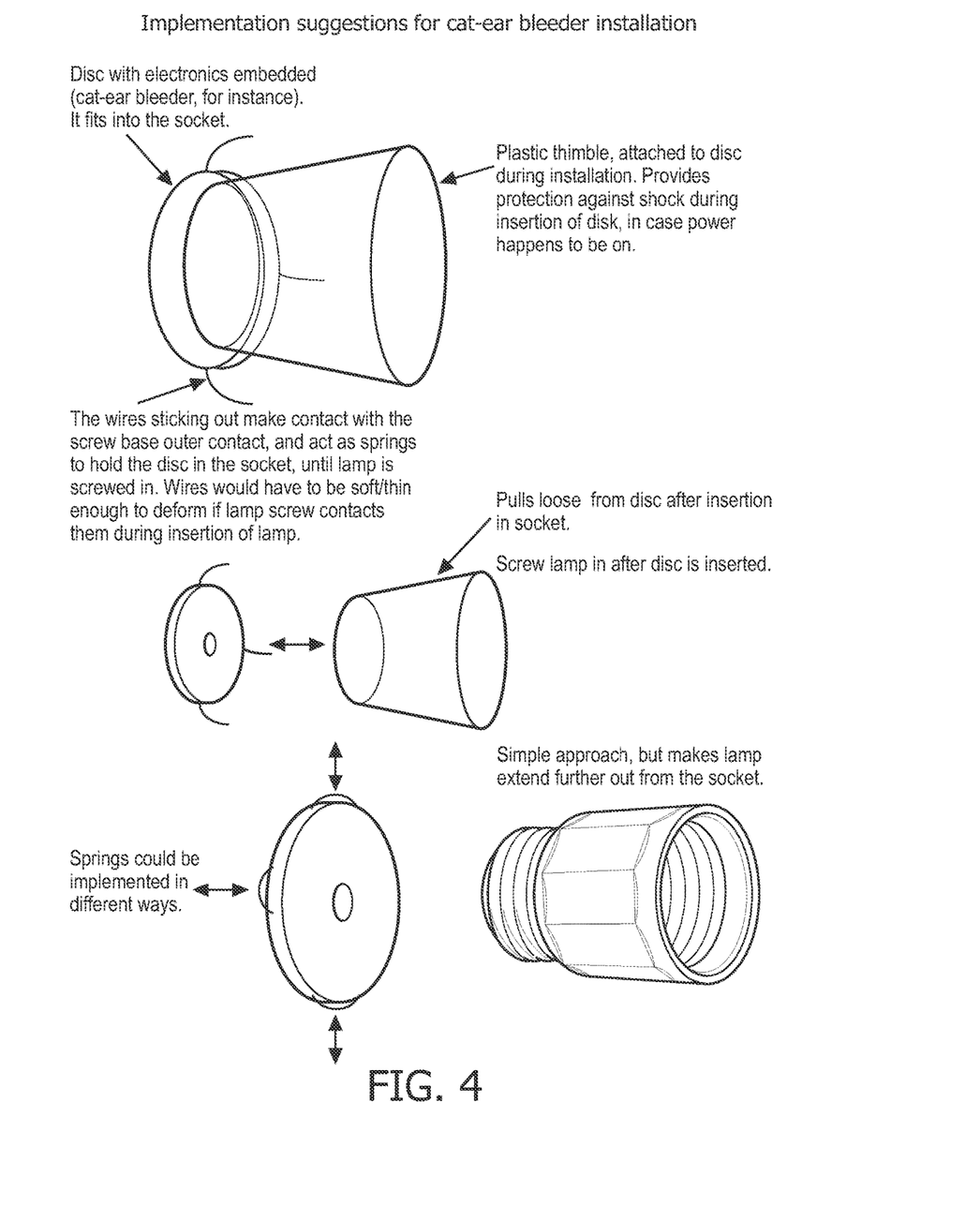
FIG. 4 shows schematic diagrams of how the cat ear bleeder could be implemented for easy installation in a screw-base socket.

As mentioned above, the adapter circuit 120 is connected in parallel with the lighting unit 160 following the dimmer 110, between the unrectified (dimmed) line voltage provided by the voltage mains 101 and neutral. In the embodiment depicted in FIGS. 1A and 1B, the adapter circuit 120 is external to the lighting unit 160. For example, the adapter circuit 120 may be included in an extender adapted to screw into a conventional screw socket at one end and to receive a screw base of the lighting unit 160 at another end, as discussed below with reference to FIGS. 7 and 8. It may be in the form of a thin disk that fits into the screw base, inserted between the lamp and the screw base, as shown in FIG. 4. However, in alternative embodiments, the adapter circuit 120 may be located within the lighting unit 160. For example, the adapter circuit 120 may be connected between the unrectified (dimmed) line voltage and neutral at the input of the voltage rectifier 130, or between the DC drive voltage and neutral at the output of the power converter 140. Including the adapter circuit 120 within the lighting unit 160 consolidates the circuitry and eliminates the need for the extender. However, the adapter circuit 120 would be extraneous if the lighting unit 160 is not connected to a dimmer circuit. Likewise, in alternative embodiments, the adapter circuit 120 may be incorporated in the dimmer 110, for example, where the dimmer 110 has a connection to neutral, as shown in FIG. 1B. Again, such a configuration consolidates the circuitry and eliminates the need for the extender, but may decrease efficiency and increase thermal load in the dimmer 110. Regardless of its physical location, the adapter circuit 120 functions in substantially the same manner.

Figure 2:
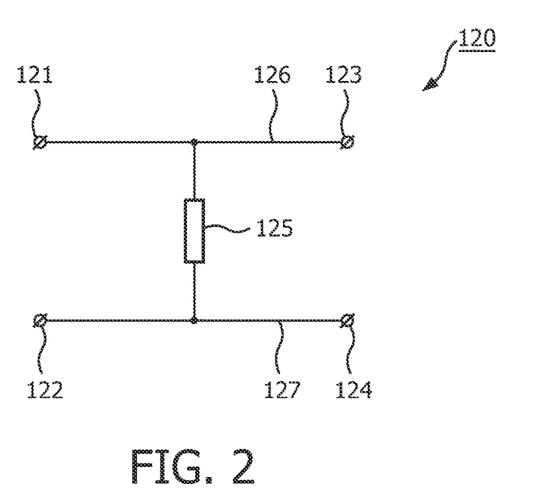
FIG. 2 is a simplified circuit diagram showing an adapter circuit, according to a first representative embodiment.

FIG. 2 is a simplified circuit diagram showing an adapter circuit, according to a representative embodiment.

Referring to FIG. 2, the adapter circuit 120 includes resistor 125 connected between line conductor 126 and neutral conductor 127. In the circuit depicted in FIGS. 1A and 1B, the resistor 125 would connect to the dimmer 110 via input terminals 121 and 122, and would connect to the voltage rectifier 130 of the lighting unit 160 via output terminals 123 and 124. Alternatively, the resistor 125 may be contained within the lighting unit 160 or the dimmer 110, as discussed above. The value of the resistor 125 may be within a range of about 15 kOhms to about 25 kOhms, for example, which produces about 0.5 Watt to about 1.5 Watts of power dissipation. However, the resistance may vary to provide unique benefits for any particular situation or to meet application specific design requirements of various implementations. For example, the resistor 125 generally will have higher values for lower wattage lamps and lower values for higher wattage lamps. Further, although depicted as a single resistor, it is understood that the adapter circuit 120 may include other circuits and/or multiple resistors 125 and/or other resistive components to provide the desired resistance, without departing from the scope of the present teachings.

Figure 3:
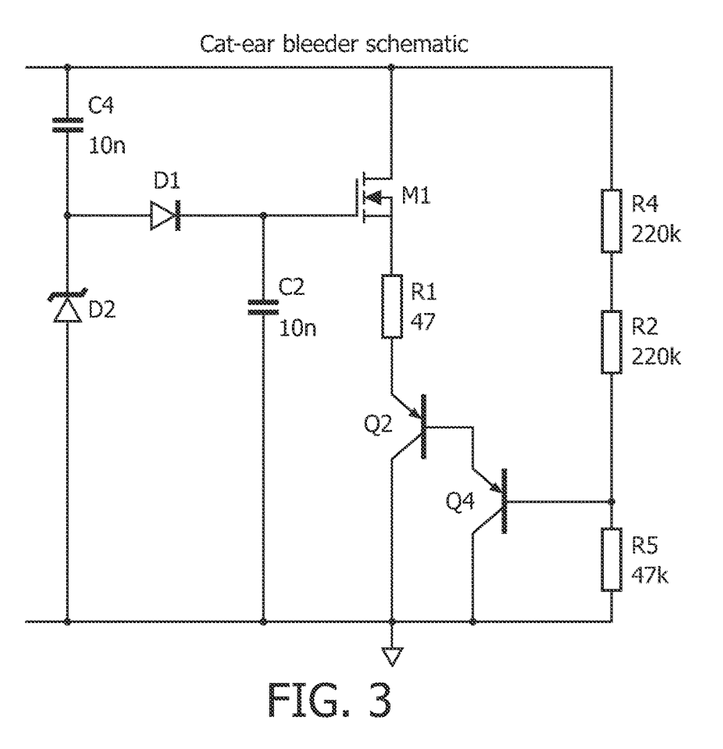
FIG. 3 is a simplified circuit diagram showing an adapter circuit, according to a second representative embodiment referred to as "a cat ear bleeder."

FIG. 3 depicts another circuit providing flicker suppression/compatibility enhancement. The approach of FIG. 3 is more efficient, but more complex than that of FIG. 2. The circuitry of FIG. 3 may be used, with proper component selection, to limit the time at which current can pass through the lamp to those times when voltage is relatively low, which improves efficiency, while still providing flicker suppression/compatibility enhancement.

Figure 7:
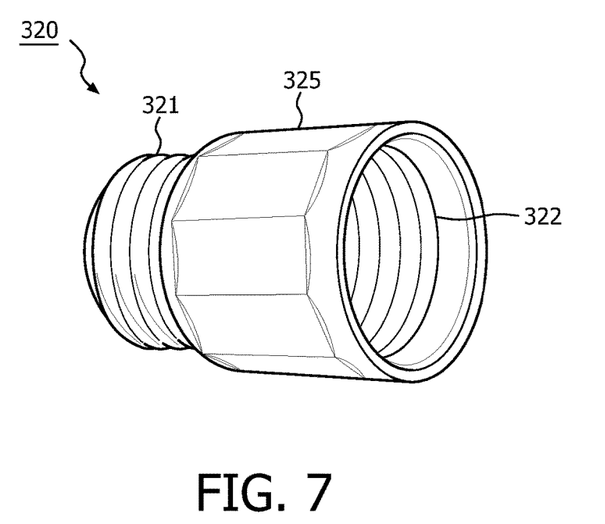
FIG. 7 is a perspective view of an adapter circuit, according to another representative embodiment.
Figure 8:
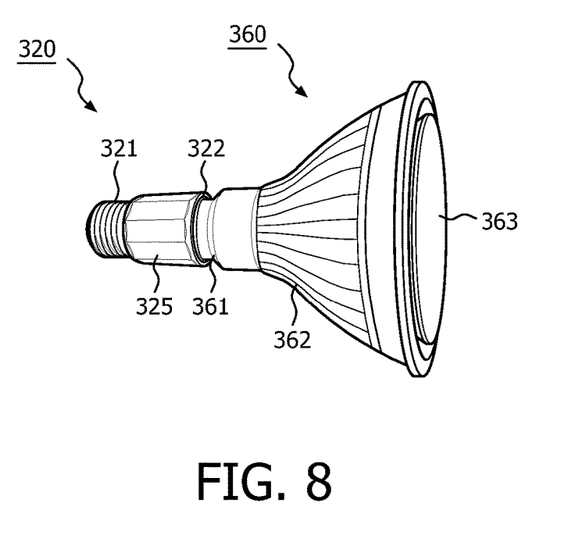
FIG. 8 is a perspective view of an adapter circuit and an LED lamp, according to a representative embodiment.

FIG. 7 is a perspective view of an adapter circuit included within an extender, according to a representative embodiment, and FIG. 8 is a perspective view of a retrofit LED lighting unit attached to the flicker suppression circuit, according to a representative embodiment.

Referring to FIG. 7, extender 320 includes screw base 321 on a first end of extender body 325 and lamp socket 322 in a second end of the extender body 325, opposite the first end. The screw base 321 of the extender 320 is a conventional screw base, such as an Edison screw base, configured to connect with (screw into) a conventional incandescent lamp socket. The lamp socket 322 is similarly a conventional incandescent lamp socket configured to receive a conventional screw base (e.g., Edison screw base) of a retrofit solid state light source device, such as lighting unit 160. In various, alternative embodiments, the extender 320 may include any type of base and lamp socket for connecting with corresponding types of incandescent lamp sockets and bases of retrofit solid state light source devices, without departing from the scope of the present teachings. For example, the extender 320 may include a pin base on the first end for plugging into an incandescent (or fluorescent) lamp socket, and a pin socket in the second end for receiving a pin base of a retrofit solid state light source lamp.

A disadvantage of the approach of FIGS. 7 and 8 is that the effective lamp length is increased by the lamp extender. The increase in length can be greatly reduced by incorporating the flicker suppression/compatibility enhancement electronics in a disk that may be inserted into the screw base socket, as shown in FIG. 4. Following insertion of the disc in the socket, the lamp is screwed into the socket.

The extender body 325 may be formed of a suitable insulating material, such as plastic. The circuitry of the adapter circuit 120 is contained within the extender body 325. For example, referring to FIG. 2, the input terminals 121 and 122 would be connected to the hot and neutral connectors (not shown) of the screw base 321 and the output terminals 123 and 124 would be connected to the hot and neutral connectors (not shown) of the lamp socket 322, respectively, in a known manner. The resistor 125 is thus connected between the hot (or line) conductor 126, extending between input terminal 121 and output terminal 123, and the neutral conductor 127, extending between input terminal 122 and output terminal 124, such that the resistor 125 forms a parallel circuit with the lighting unit 160 once it is screwed into the lamp socket 322.

For a dimmer circuit having multiple LED lamps, an extender 320 would be used to connect each of the LED lamps to a corresponding lamp socket of the dimmer circuit. However, inclusion of an extender 320 for fewer than all of the LED lamps may still reduce flickering to an acceptable level. Generally, the extender 320 in the depicted configuration would consume about 0.5 Watt power, as mentioned above, and therefore does not increase thermal load by an appreciable amount. Also, for larger numbers of LED lamps on the dimmer circuit, additional resistors 125 may be provided, as needed, to successfully reduce or suppress flickering. Generally, a single adapter circuit 120 (e.g., connected to one lighting unit) reduces or eliminates flicker for multiple lighting units (or lamps) in the same dimming circuit. The number of lighting units in the same dimming circuit that can be stabilized by a single adapter circuit 120 depends on the type of lighting units and the type of dimmer 110.

Referring to FIG. 8, representative retrofit lighting unit 360 is shown attached (screwed into) the extender 320. The lighting unit 360 is a lamp containing a solid state light source, and includes screw base 361, housing 362 and lens 363. The housing 362 and the lens 363 form a compartment containing circuitry of the dimmable solid state light source, e.g., as described above with reference to lighting unit 160. The screw base 361 of the lighting unit 360 is a conventional screw base, such as an Edison screw base, configured to connect with (screw into) the lamp socket 322 of the extender 320. The circuitry thereby receives (dimmed) unrectified line voltage through a dimmer, such as dimmer 110, and generates light via the solid state light source, e.g., LED lighting module 150, as discussed above. The light exits the lighting unit 360 through the lens 363. By virtue of being contained in the extender body 325, the adapter circuit 120 is automatically connected in parallel with the lighting unit 360 once the screw base 361 is screwed into the lamp socket 322, thus reducing or eliminating flicker that may otherwise result from operation of the dimmer 110.

Of course, configurations of the extender 320 and/or the lighting unit 360 may vary without departing from the scope of the present teachings. Also, in various alternative embodiments, the adapter circuit 120 may be physically located within the housing 362 of the lighting unit 360, as mentioned above with reference to FIGS. 1A and 1B, thus eliminating the need for the extender 320.

Figure 9:
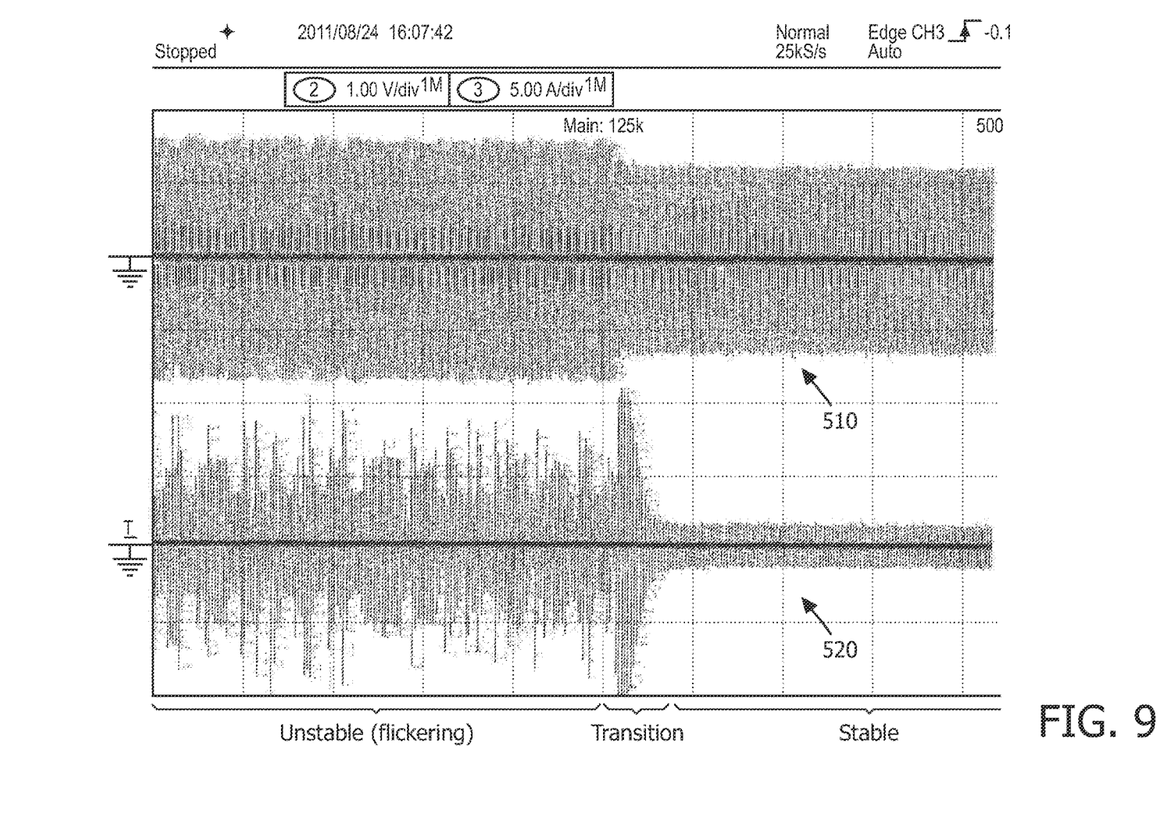
FIG. 9 shows traces illustrating voltage and current through an LED lamp with and without an adapter circuit, according to a representative embodiment.
Figure 10:
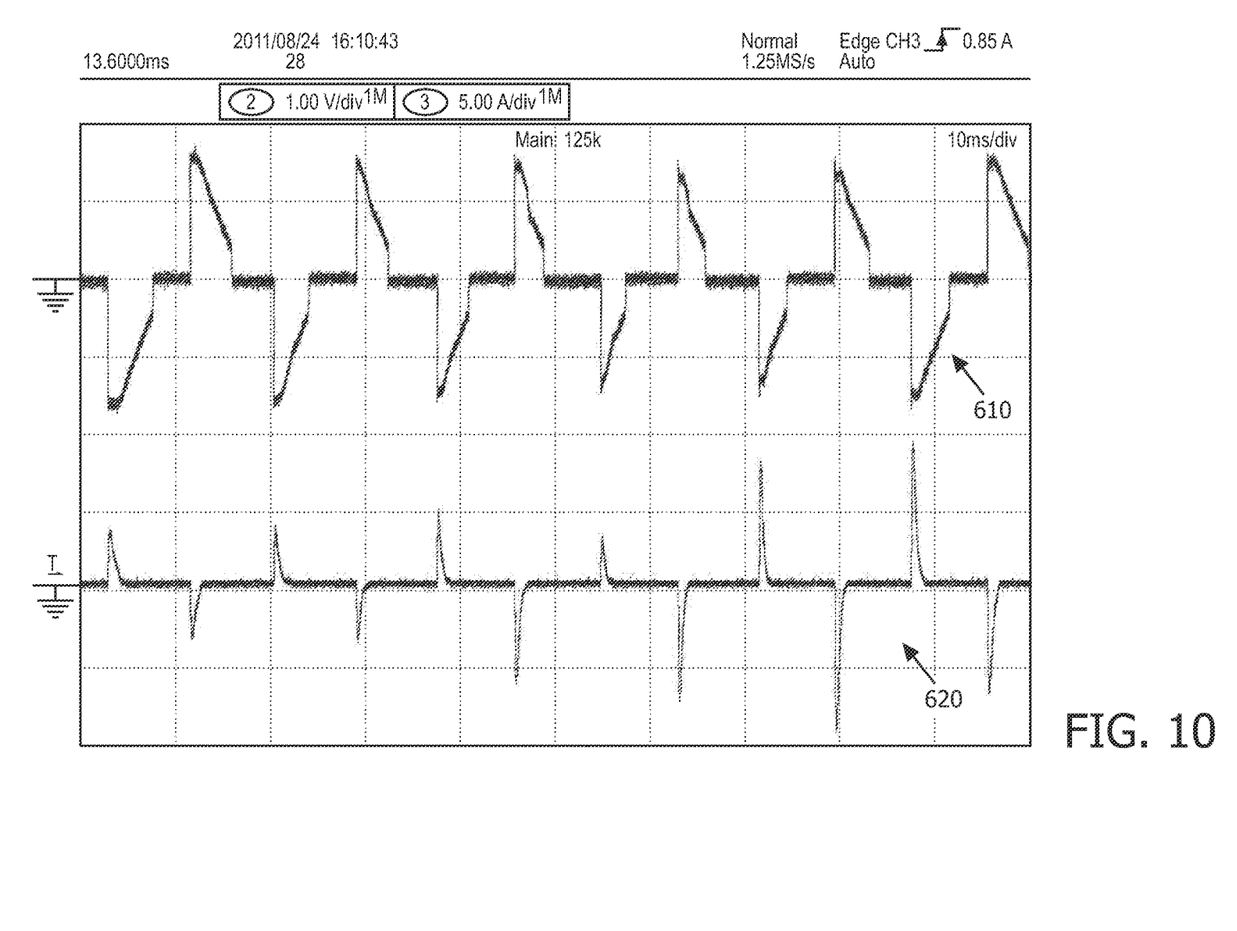
FIG. 10 shows traces illustrating voltage and current through an LED lamp without an adapter circuit.
Figure 11:
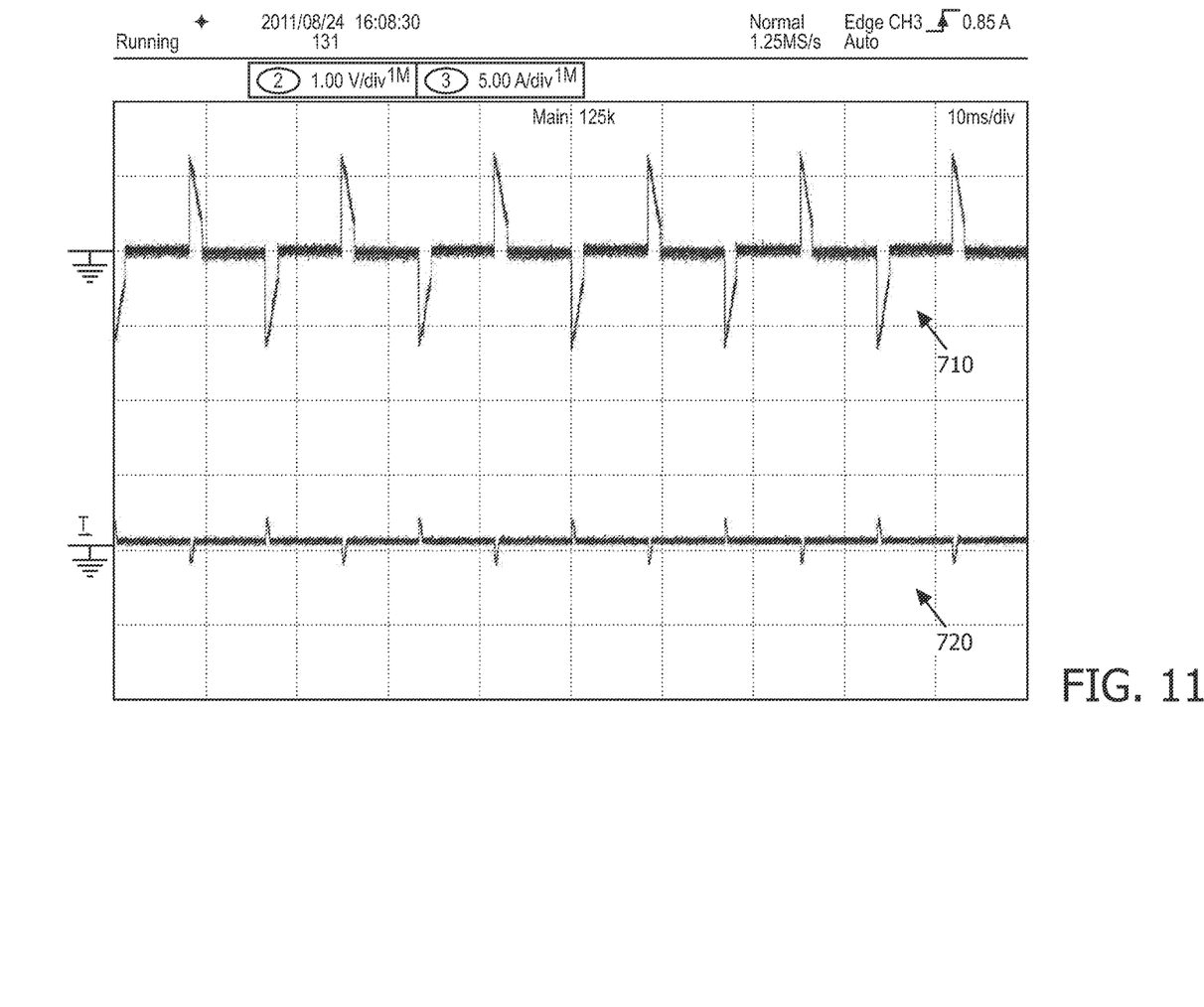
FIG. 11 shows traces illustrating voltage and current through an LED lamp with an adapter circuit, according to a representative embodiment.

FIGS. 9-11 are traces enabling comparison between solid state light source devices with and without adapter circuits. In particular, FIG. 9 shows traces using a long time scale that illustrate voltage and current through a dimmer circuit including multiple lighting units with corresponding LED modules, without and with an adapter circuit, according to a representative embodiment, as well as the transition where the adapter circuit is added. FIG. 10 shows traces using a short time scale that illustrate voltage and current through the dimmer circuit without an adapter circuit, and FIG. 11 show traces using a short time scale that illustrate voltage and current through the dimmer circuit with an adapter circuit, according to a representative embodiment. The traces of FIGS. 9-11 were generated using five PAR38 LED lamps, available from Philips Electronics, in the dimmer circuit, and a DVCL-153PD dimmer, available from Lutron Electronics, which is a Compact Fluorescent light (CFL)-LED dimmer. The scale is one volt per division for the voltage waveforms and five amps per division for the current waveforms.

Referring to FIG. 9, the dial for tuning the lowest dimming level of the dimmer was set to allow the widest range of dimming, causing the lamps to flicker. Top waveform 510 shows variations in voltage and bottom waveform 520 shows variations in current, where the voltage for the voltage waveform 510 was measured across the LED lamps and the current for the current waveform 520 was measured to the LED lamps. The effects of the adapter circuit are clearly shown on either side of the "Transition" region, which is the time period during which an extender containing the adapter circuit, such as adapter circuit 120, was switched into the circuit. That is, the "Unstable (flickering)" region of the voltage and current waveforms 510 and 520 (left side of FIG. 5) was obtained without an adapter circuit, and the "Stable" region of the voltage and current waveforms 510 and 520 (right side of FIG. 9) was obtained with an adapter circuit connected in parallel with one of the LED lamps. The variations in magnitude of the voltage and current waveforms 510 and 520 are significantly less in the "Stable" region, indicating that flicker is substantially eliminated by the adapter circuit. In other words, the oscillation causing the flickering stops, and the patterns of the voltage and current waveforms 510 and 520 become stable upon insertion of the adapter circuit. The transition region lasts about 0.5 seconds, during which the instability gradually disappears.

FIGS. 10 and 11 include traces obtained using a short time scale, and thus show substantially the same information as FIG. 9, in greater detail. Referring to FIG. 10, top waveform 610 shows variations in voltage and bottom waveform 620 shows variations in current obtained without an adapter circuit, where voltage for the voltage waveform 610 was measured across the LED lamps and the current for the current waveform 620 was measured to the LED lamps, as discussed above with reference to the "Unstable (flickering)" region of FIG. 5. The voltage and current waveforms 610 and 620 capture a moment in instability where the voltage and current are changing, leading to flashing, for example. As shown, the amplitudes of the current waveform 620 change, generally increasing in magnitude over time during the depicted period. The amplitudes of the voltage waveform 610 change somewhat, but the widths of the pulses change significantly. These changes occur, because of interaction between the dimmer and the LED lamps, over a time period that is much longer than the 60 Hz line period, and are therefore readily perceivable by eye.

Figure 5:
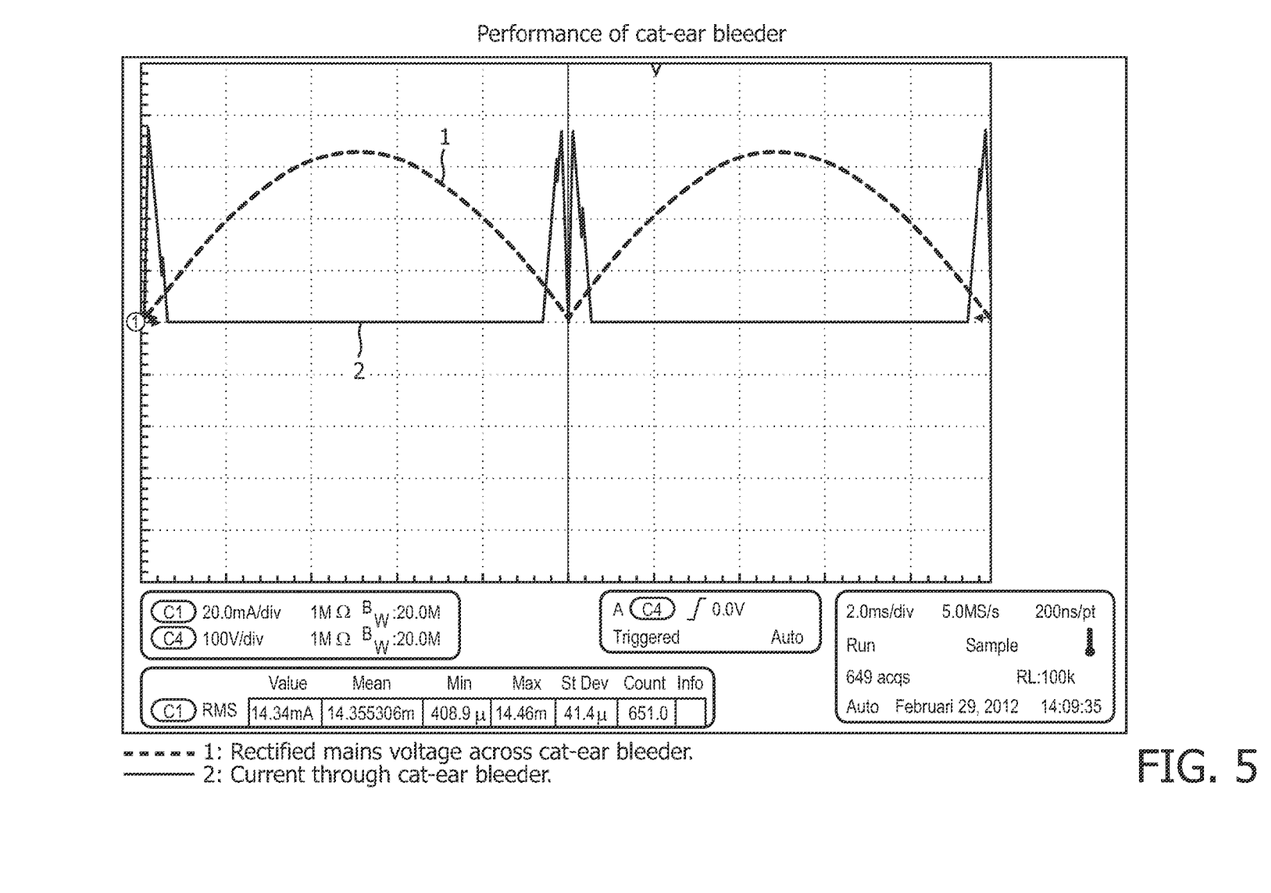
FIG. 5 shows a representative example of the current drawn by a cat-ear bleeder during operation.
Figure 6:
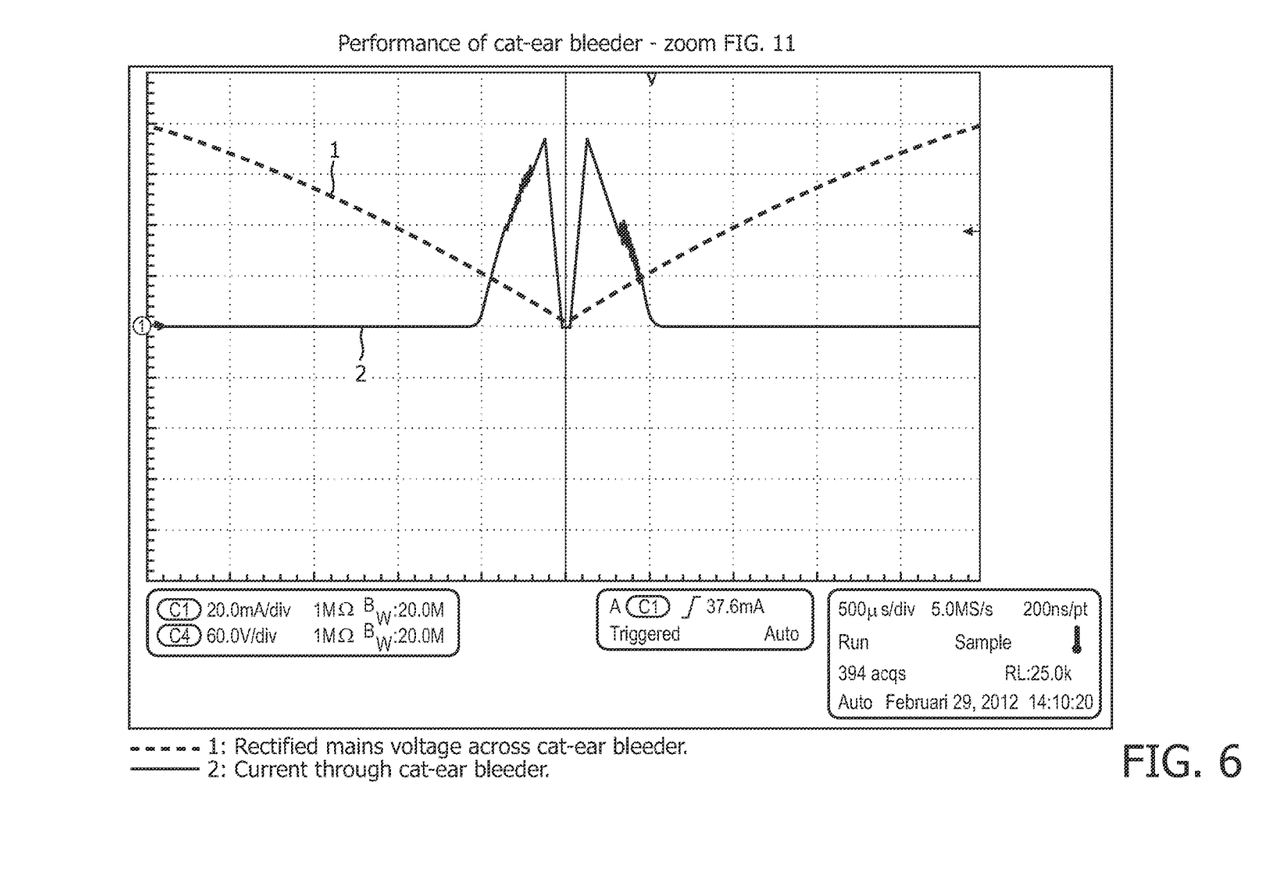
FIG. 6 shows an enlargement of the region of FIG. 5 where the cat-ear bleeder conducts current.

Referring to FIG. 11, top waveform 710 shows variations in voltage and bottom waveform 720 shows variations in current obtained with an adapter circuit, where voltage for the voltage waveform 710 was measured across the LED lamps and the current for the current waveform 720 was measured to the LED lamps, as discussed above with reference to the "Stable" region of FIG. 5. As shown, the current and voltage pulses are consistent. The driving electronics maintain the LED current nearly constant with these input waveforms, and there is no variation perceivable to the eye. The voltage and current waveforms 710 and 720 thus show substantial improvement in stability (and thus reduction or elimination of flicker) as compared to the voltage and current waveforms 610 and 620.

The adapter circuit may be applied to retrofit solid state light device applications, where it is desired to control the light output based on the mains voltage signal. The various embodiments have a number of advantages over inserting an incandescent lamp among LED lamps in a dimmer circuit. For example, less power is wasted. Also, the beneficial effect of the resistance is not lost, as it would be when the incandescent lamp burns out, and no replacement of the incandescent lamp is required. Also, the adapter circuit may be added to as many sockets as required to reach the desired effect. For example, one adapter circuit connected to one LED lamp may eliminate flicker for up to four LED lamps in the same dimmer circuit, and two adapter circuits respectively connected to two LED lamps may eliminate flicker for up to eight LED lamps in the same dimmer circuit.

Generally, yet another aspect of the invention stems from considering that light sources with an electronic converter, such as SSL-based retrofit lamps, need to have a fast startup of the electronic driver to prevent a turn-on delay. If these lamps are used with consumer (leading/trailing edge) dimmers, the effective input voltage that is available for startup can be extremely low, when the dimmer is turned on at its lowest dimming level. In general, an active startup circuit with a high-voltage transistor is used to overcome this issue.

To ensure a proper interaction of the driver with the dimmer, a dimmer compatibility circuit is used to switch on dynamically an extra load on the mains. Also for this function a high voltage transistor is needed.

Thus, it has been recognized that the startup function can be combined with the additional circuit for dimmer compatibility, thus eliminating a second high voltage transistor.

As skilled artisans readily recognize, traditional circuits for dimmer compatibility are referred to as bleeders, a resistor that is connected to the mains connection (usually after a diode bridge) via a high-voltage transistor. These circuits exhibit a typical high loss, because the resistor needs to be dimensioned such that it can still draw enough current at low instantaneous mains voltage. More advanced bleeders are constant current sources, which have a lower power loss for the same specified minimum current.

The inventive solution for the combined circuit will exhibit a behaviour that will increase the current at low mains voltages, and decrease the current at high mains voltages. The mechanism will reduce the bleeder losses considerably, while enabling a high current conduction (low impedance) for the dimmer.

This circuit can also be used as a stand-alone dimmer compatibility circuit, in which case, only one circuit would be needed per dimmer (instead of in every connected lamp)

The bleeder function is performed by enabling a low impedance path for current conduction (through the mains terminals of the lamp) Essential for the invention is that this current conduction capability is reverse coupled to the instantaneous voltage across the mains terminals of the lamp.

low mains voltage→low impedance→high current high mains voltage→high impedance→low current
(decreasing to 0)

The power losses in the bleeder are reduced compared to the other traditional methods. Furthermore, this function can be combined with the fast-startup function, using the same HV transistor. Even one step further, is to extend the function of the circuitry with a power converter e.g. boost converter, for mains current modulation (enabling a high power factor conversion topology).

Figure 12A:
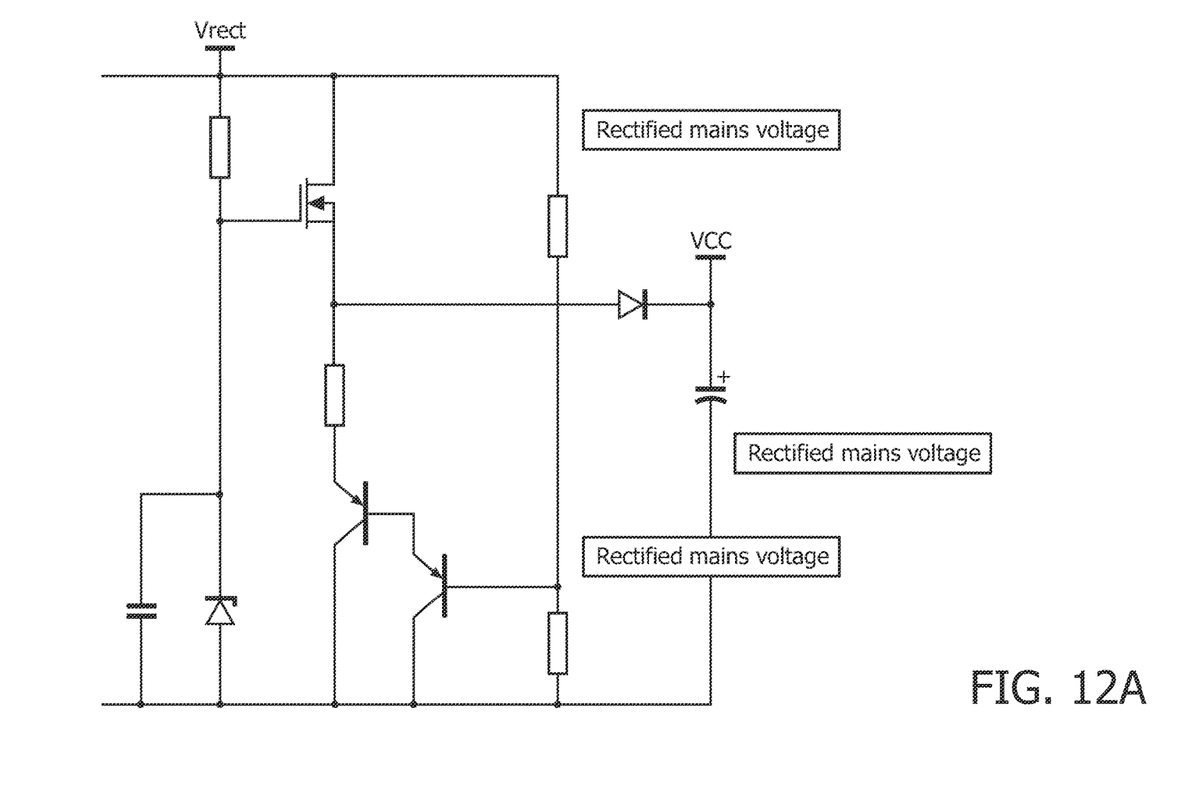
FIGS. 12a-12b depict a circuit diagram showing an adapter circuit, according to a yet another representative embodiment.
Figure 12B:
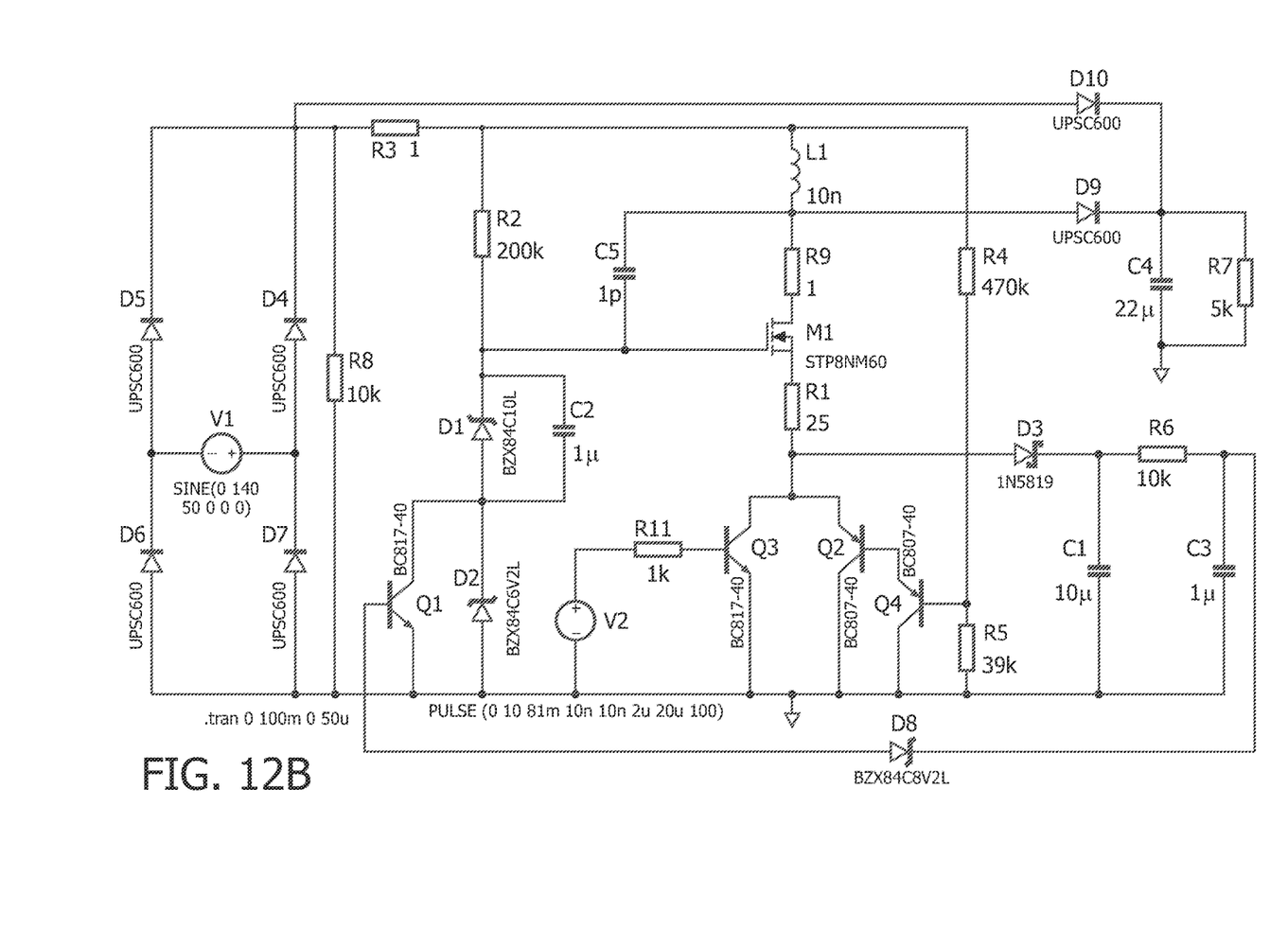

Referring to FIGS. 12a-12b, the example circuit is build-up using a source-switched HV mosfet. The gate is biased at a constant voltage through the resistor/zener/capacitor combination.

The amount of current that is conducted through the mosfet is determined by the source resistor and the voltage at the emitter of the darlington.

This voltage is derived from the instantaneous mains voltage through the resistor divider. The resulting current is: (Vg-Vth-Vdarling)/Rsource. Referring to FIG. 12b, a boost circuit can also be provided.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

It should also be understood that, unless clearly indicated to the contrary, in any methods claimed herein that include more than one step or act, the order of the steps or acts of the method is not necessarily limited to the order in which the steps or acts of the method are recited.

Reference numerals appearing in the claims in parentheses, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. An extender device for suppressing flicker in a lighting unit including at least one light emitting diode (LED) and a power converter for converting rectified AC voltage to corresponding DC voltage and current for powering the at least one LED, the device comprising:
   an extender base configured to be inserted into a lamp socket connected to a dimmer, the lamp socket being configured to receive an incandescent lighting unit;
   an extender socket configured to receive the lighting unit including the at least one LED and the power converter; and
   an extender body located between the extender base and the extender socket, the extender body containing an adapter circuit configured to be electrically connected in parallel with the at least one LED when the lighting unit is inserted in the extender socket, wherein the adapter circuit suppresses flicker of the at least one LED caused by the dimmer,
   wherein the extender base comprises a screw base, and
   wherein the extender socket comprises a screw socket.

2. The device of claim 1, wherein the lamp socket comprises a screw socket configured to receive the incandescent lighting unit.

3. The device of claim 1, wherein the adapter circuit comprises a resistor having a first end and a second end, wherein when the extender base is inserted into the lamp socket connected to the dimmer the first end of the resistor is directly connected to an output terminal of the dimmer and the second end of the resistor is directly connected to a neutral line of an AC mains supply which supplies a voltage to the dimmer.

4. The device of claim 1, wherein the lighting unit includes a voltage rectifier for providing the AC rectified voltage to the power converter, and wherein the adapter circuit comprises a resistor having a first end configured to be directly connected to a first input terminal of the voltage rectifier and having a second end configured to be directly connected to a second input terminal of the voltage rectifier such that the resistor is connected directly in parallel with an input of the rectifier.

5. The device of claim 1, wherein the extender socket is a screw socket having threads which are configured to receive therein and engage a screw base of the lighting unit.

6. The device of claim 5, wherein the extender base includes threads which are configured to be screwed into the lamp socket connected to the dimmer.

* * * * *